United States Patent [19]
Turlington et al.

[11] Patent Number: 5,940,031
[45] Date of Patent: *Aug. 17, 1999

[54] TRANSMIT/RECEIVE MODULE FOR PLANAR ACTIVE APERTURES

[75] Inventors: Thomas R. Turlington, Linthicum; Patrick G. Farrell, Baltimore; Gerald K. Kane, Stevensville; Gary L. Ferrell, Pasadena; Scott K. Suko, Elkridge; Joseph A. Faulkner, Ellicott City; Gregory K. Sinon, Dayton; Francis W. Hopwood, Severna Park; Andrew J. Piloto, Columbia, all of Md.

[73] Assignee: Northrop Grumman Corporation, Los Angeles, Calif.

[*] Notice: This patent is subject to a terminal disclaimer.

[21] Appl. No.: 09/056,094

[22] Filed: Apr. 7, 1998

Related U.S. Application Data

[63] Continuation of application No. 08/708,439, Sep. 5, 1996, Pat. No. 5,745,076.

[51] Int. Cl.⁶ ........................................... H01Q 3/24
[52] U.S. Cl. ........................... 342/372; 342/373; 342/374
[58] Field of Search ............................... 342/81, 154, 372, 342/373, 374

[56] References Cited

U.S. PATENT DOCUMENTS 4,967,201  10/1990  Rich, III.
5,745,076   4/1998  Turlington et al. ..................... 342/372

*Primary Examiner*—Thomas H. Tarcza
*Assistant Examiner*—Dao L. Phan

[57] ABSTRACT

A T/R module including a multilevel, multichip microwave package having a plurality of gallium arsenide monolithic microwave integrated circuit chips (MMICs) implementing RF switching elements, a variable phase shifter, a plurality of RF amplifiers, and gain trim attenuators and which are located on a planar RF assembly. The module's architecture includes shared or common MMIC circuit elements during both transmit and receive operation modes thus reducing the number of MMICs required while at the same time preloading the supply voltage regulator-modulator which supplies DC power to all the MMIC circuits without degrading T/R module efficiency.

9 Claims, 7 Drawing Sheets

FIG. 7
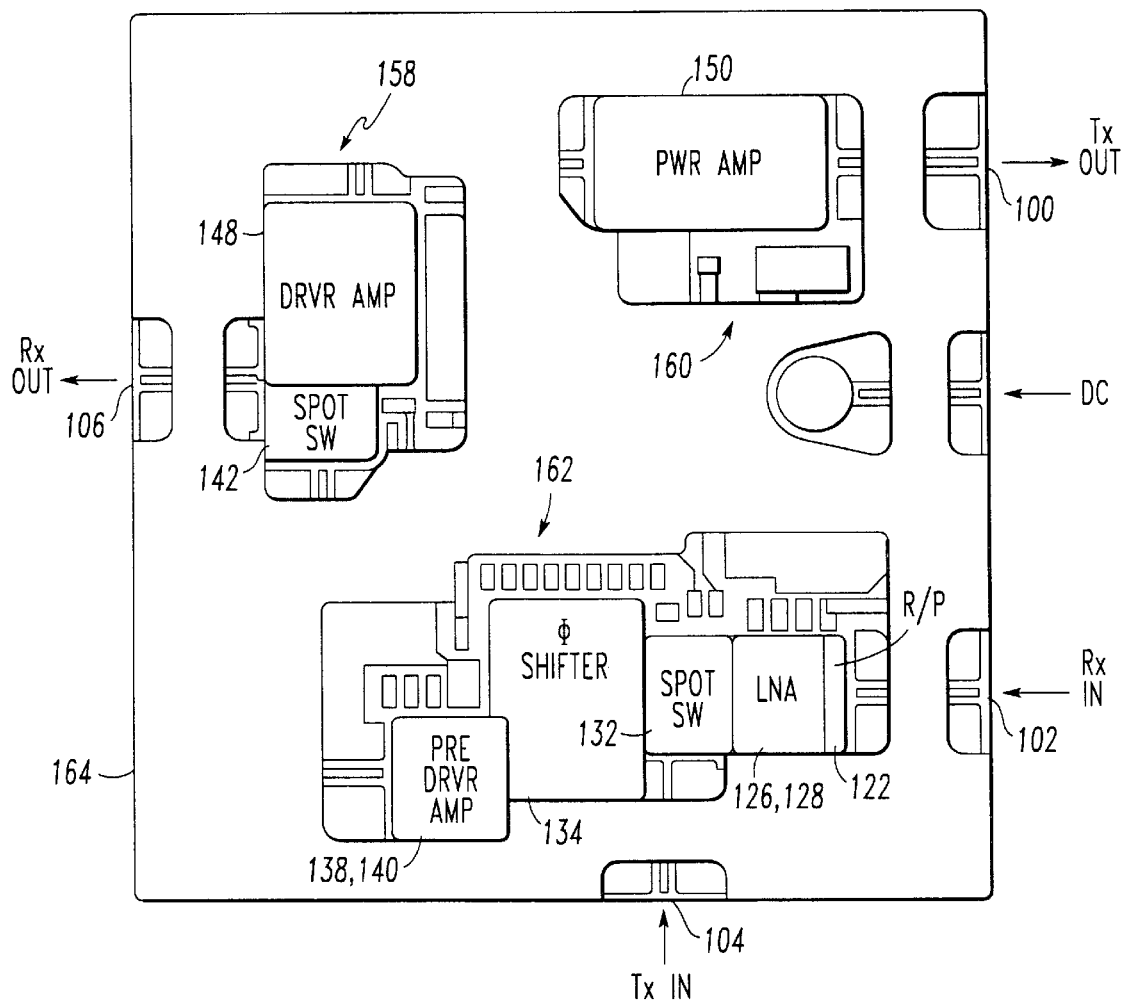
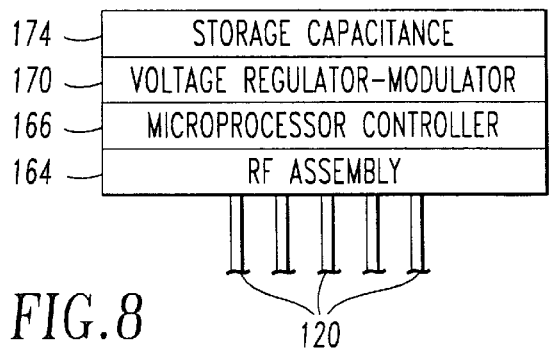
FIG. 8
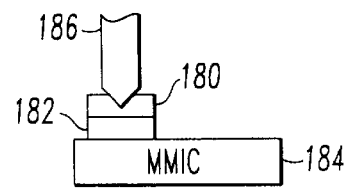
FIG. 9

TRANSMIT/RECEIVE MODULE FOR PLANAR ACTIVE APERTURES

This application is a continuation of application Ser. No. 08/708,439 filed on Sep. 5, 1996, U.S. Pat. No. 5,745,076 the entire contents of which are hereby incorporated by reference.

BACKGROUND OF THE INVENTION

1. Field of the Invention

This invention relates generally to transmit/receive (T/R) devices used in apparatus such as radar equipment where an RF transmitter and an RF receiver are alternately coupled to and from an antenna and more particularly to a T/R module for planar active apertures of a phased antenna array.

2. Description of Related Art

Active apertures now being developed for radar, electronic counter measures (ECM), electronics security measures (ESM) and other types of microwave communications apparatus require structures that are thinner, lighter in weight, lower in cost and those that exhibit improved thermal expansion management along with requirement for easier maintenance. Planar phased arrays, which are generally known, lead to this end and involve structures where layers of RF manifold, DC power manifold, data distribution and cooling channels are assembled into a planar structure. In accordance with the known prior art, T/R modules including a patch type radiator on its outer surface are connected into the front of the array. One such T/R module is termed a "sugar cube T/R module" because it resembles a sugar cube in shape. However, the addition of increased functionality to such a T/R module such as a microprocessor based controller, increased memory, analog interface chips, digital interface chips, voltage regulator in other apparatus caused it to grow in length by approximately 4:1 and thus became rectangular in shape rather than square. Such a structure with patch type radiators cannot provide low radar cross-section or operating bandwidth required for a particular application and the heat which required dissipation had to be removed through a larger surface. The addition of functionality therefore caused the array design to change to a slat type configuration where, for example the T/R module function required its implementation in two separate packages on opposite side surfaces of a relatively long, thin plate radiator structure, thus giving rise to the name of a "slat" array.

It should be noted that T/R module architecture is closely related to the functionality required in the active aperture of the array in which it is used. Parameters that determine T/R module architecture are: (1) the need for low array sidelobes on receive; (2) the need for self-calibration in module to module built in test capability; (3) the need to maximize receiver input 3rd order intercept; (4) the need for low radar cross-section; (5) the need for low cost; (6) the need for maximized power added efficiency; (7) the need for radiating and receiving in various polarizations; and (8) the need for either distributed or centralized beam steering computation.

SUMMARY

Accordingly, it is a primary object of the present invention to provide an improvement in transmit/receive T/R modules utilized for transmitting and receiving RF signals coupled to and received from an antenna.

It is another object of the present invention to provide an improvement in T/R modules utilized in connection with phased array antenna elements.

It is a further object of the invention to provide an improvement in T/R modules for planar active apertures of a phased array.

The foregoing and other objects of the invention are provided by a transmit/receiver (T/R) module configuration which plugs into the backside of a planar array and includes RF, DC and data distribution manifolds which are stacked together contiguously between a cold plate and a radiating element assembly with radiating elements and circulators being assembled in a single physical unit which forms the front layer of the aperture. The T/R module itself comprises a multilevel, multichip microwave package comprised of multiple layers of high temperature co-fired ceramic (HTCC) including ground planes, strip line, data and DC interconnects thermal vias and RF input/outputs running through the RF assembly for a plurality of monolithic microwave integrated circuit chips (MMICs) fabricated in gallium arsenide (GaAs) which are located in cavities formed in an RF assembly layer. The module's architecture includes shared or common intermediate RF amplifiers which are powered ON during both transmit and receive operation modes thus reducing the number of MMICs required while at the same time preloading the supply voltage regulator-modulator which supplies DC power to all the MMIC amplifiers without degrading T/R module efficiency.

Further scope of applicability of the present invention will become apparent from the detailed description given hereinafter. However, it should be understood that detailed description and specific example, while indicating the preferred embodiment of the invention, is given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a top planar view of the RF assembly of the T/R module shown in FIGS. 3 and 4;

FIG. 8 is a diagram illustrative of the multi-layer constructions of the T/R module shown in FIGS. 3 and 4; and FIG. 9 is a diagram illustrative of the process of wedge bonding used in the present invention for making interconnections between components.

DESCRIPTION OF THE PREFERRED EMBODIMENT

Figure 1:
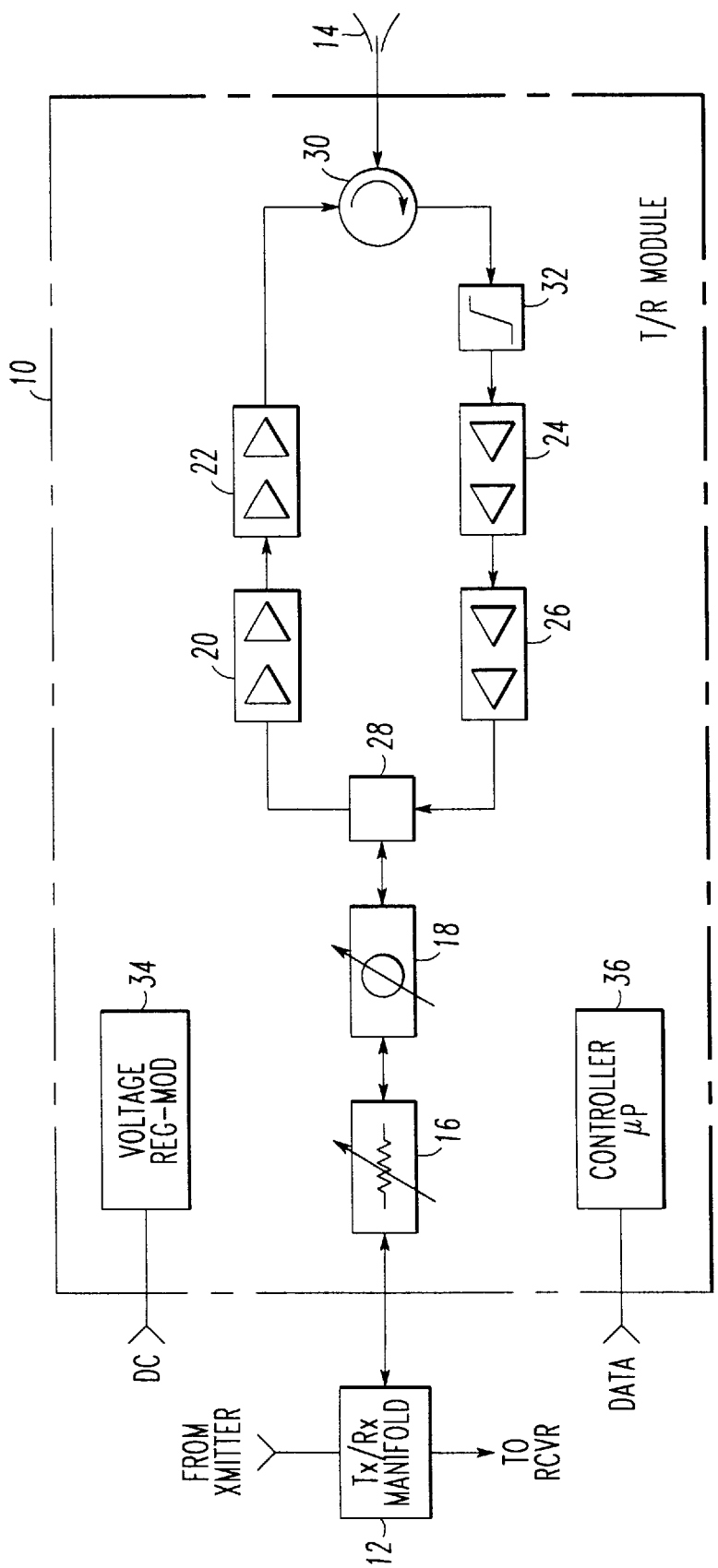
FIG. 1 is an electrical block diagram illustrative of a known T/R module where the transmit and receive functions are implemented in a common package between a common manifold and a common antenna element.

Referring now to the Figures where like reference numerals refer to like components, and more particularly FIG. 1, shown thereat is an electrical block diagram illustrative of a transmit/receive (T/R) module in accordance with the known prior art and which is identified by reference 10. The figure is illustrative of a conventional module architecture where the T/R module 10 is coupled from a common transmit (Tx) and receive (Rx) manifold 12 to a single RF antenna element 14.

As shown in FIG. 1, the T/R module 10 is implemented by means of a plurality of monolithic microwave integrated circuit chips fabricated in gallium arsenide (GaAS), hereinafter referred to as MMICs and consisting of a gain trim MMIC 16 including a variable attenuator, a phase-shifter MMIC 18 including a variable phase shifter, a driver amplifier MMIC 20, a power amplifier MMIC 22, a low noise amplifier MMIC 24 and a post-amplifier MMIC 26. The driver amp and power amp MMICs 20 and 22 are connected in series between a T/R switch 28 and an RF circulator device 30, the latter typically comprising a ferrite type circulator, a device also well known in the art.

The gain trim and phase-shifter devices 16 and 18 are coupled in series between the Tx and Rx manifold 12 and the T/R switch 28 in a unidirectional signal path for RF energy to and from the T/R switch 28. The output of the T/R switch 28 is coupled to the driver and power amplifiers 20 and 22 and comprises a unidirectional signal path to the antenna element 14 through the circulator 30. The T/R switch 28 also receives RF energy from the antenna element 14 via a unidirectional signal path in which low noise and post-amplifiers 24 and 26 and a receiver protector device 32 are connected to the circulator 30.

The amplifier MMICs 20, 22, 24, and 26 receive DC supply voltages from a voltage regulator-modulator 34 which receives a DC power supply voltage from an external source, not shown. The setting of the gain trim MMIC, the phase-shifter MMIC 18 and the T/R switch 28 are controlled by a microprocessor controller 36 or an application specific integrated circuit (ASIC), not shown, which receives data from a system beam steering controller, not shown.

This is a classic approach to transmitting and receiving RF energy in radar systems, for example, and more particularly to a phased array antenna system where each antenna element is coupled to a individual T/R module device attached, for example, to the front of the array just behind the individual antenna elements.

Figure 2:
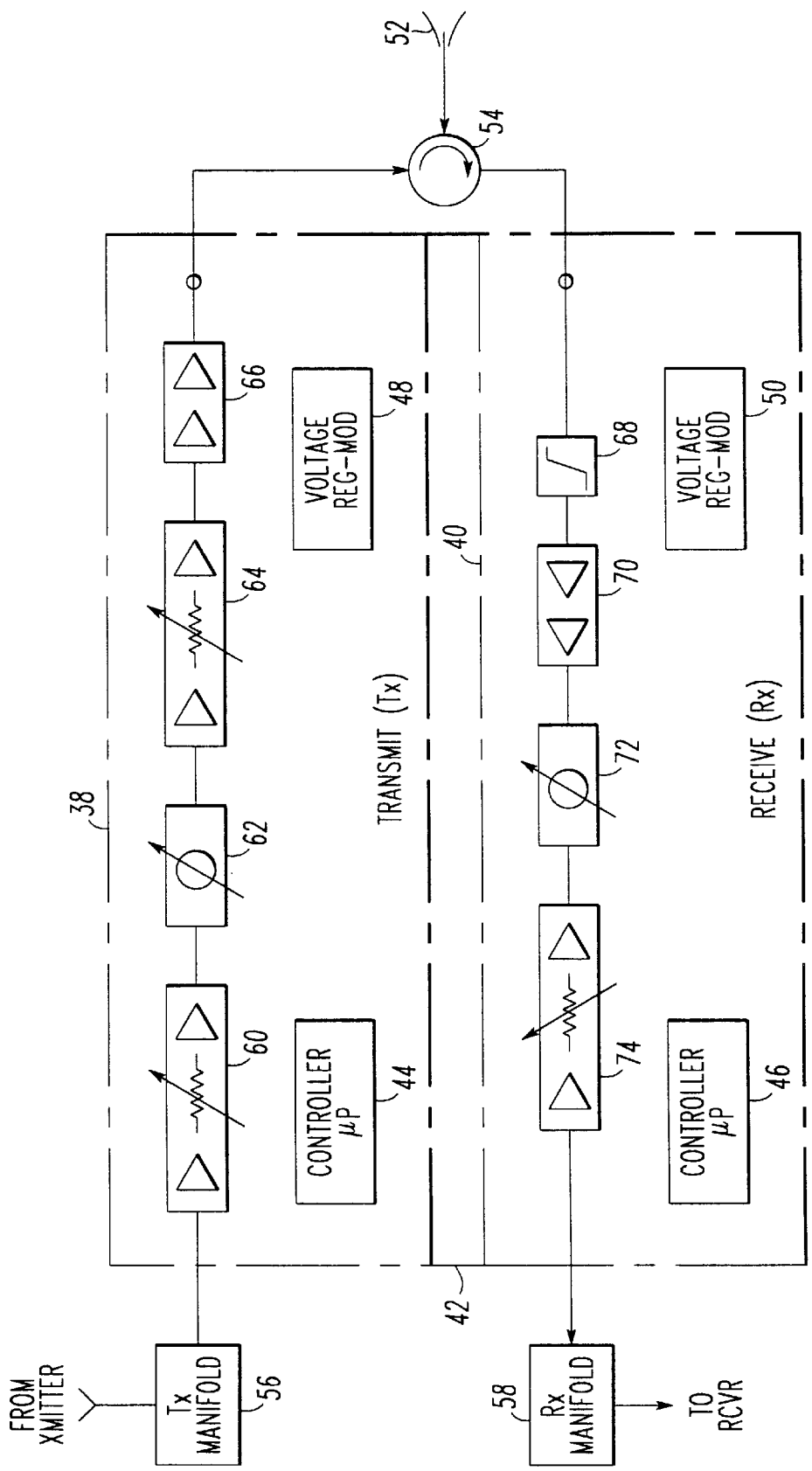
FIG. 2 is an electrical block diagram illustrative of a T/R module configuration comprised of separate transmit and receive modules located between respective transmit and receive manifolds and a common antenna element.

A second known prior art implementation of apparatus for implementing the T/R function in a phased-array antenna system, typically a planar array, is shown in FIG. 2 where separate T/R modules 38 and 40 are mounted on elongated, relatively thin flat cooling slat members, schematically represented by reference 42 that assemble into an antenna array, not shown, perpendicular to the radiating surface. As further shown in FIG. 2, each of the modules 38 and 40 include their own microprocessor or ASIC controllers 44 and 46 and voltage regulators-modulators 48 and 50. Each T/R module 38 and 40, moreover, includes its own unidirectional RF signal path between a common antenna element 52 and circulator 54 and a transmit manifold 56 and receive manifold 58 respectively coupled to RF transmitter and receiver apparatus (not shown).

The RF signal path in the transmit module 38 is implemented by a gain trim MMIC 60 which includes both amplification and variable attenuation, a variable phase-shifter MMIC 62, a driver amplifier MMIC 64 which also includes amplification and variable attenuation and an output power amplifier 66. Again, the MMICs are fabricated in GaAs.

In a similar fashion, the unidirectional RF signal path implemented in the receive module 40 includes a receiver protector 68, a low noise amplifier MMIC 70, a phase-shifter MMIC 72 and a post-amplifier and gain trim MMIC 74, the latter device also providing both amplification and variable attenuation. Such a configuration evolved because of the addition of functionality caused by array design dictated the need for higher power transmission accompanied with low radar cross-section and/or operating bandwidths required for a particular application.

This now leads to the consideration of the preferred embodiment of the invention. Referring now collectively to FIGS. 3–8, FIG. 3, for example, discloses a radar aperture directed to a multiplicity of like T/R modules 76 which is the inventive entity of this patent application and which are plugged into the rear side of a planar phased array antenna comprised of contiguous planar layers of sub-system components including a cooling plate 78 for dissipating the heat generated by T/R modules 76, a DC power manifold 80, a control data distribution manifold 82, RF receive and transmit manifolds 84 and 86, and finally a radiating element assembly 88 including a plurality of flared notched radiating elements 90 arranged in vertical columns together with a circulator assembly shown by reference numeral 92 in FIG. 4.

Figure 4:
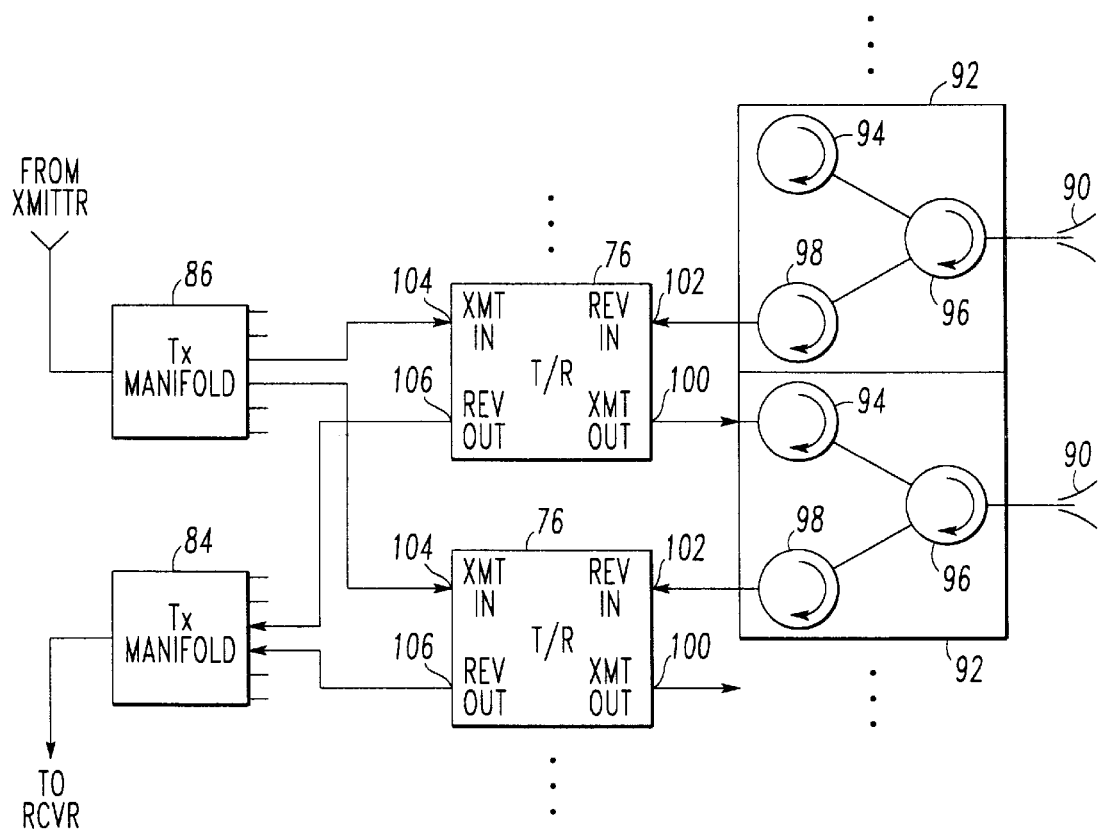
FIG. 4 is a partial electrical block diagram illustrative of a plurality of T/R modules shown in FIG. 3 connected between common transmitter and receiver manifolds and respective radiating elements of a multi-element antenna array.

With reference now to FIG. 4, each circulator assembly 92 consists of three RF circulator elements 94, 96 and 98 such that the transmit output port 100 of one T/R module 76 couples to a circulator element 94 which is coupled to a radiating element 90 via an intermediate circulator element 96. The return RF energy is coupled from a radiator element 90 to circulator element 98 via the intermediate circulator 96 where it is coupled to the receiver input port 102 of the next adjacent T/R module 76. Further as shown in FIG. 4, a common transmit manifold 86 couples to transmit input ports 104 of all the T/R modules 76 while a common receive manifold 84 couples to all of the receiver output ports 106.

Figure 3:
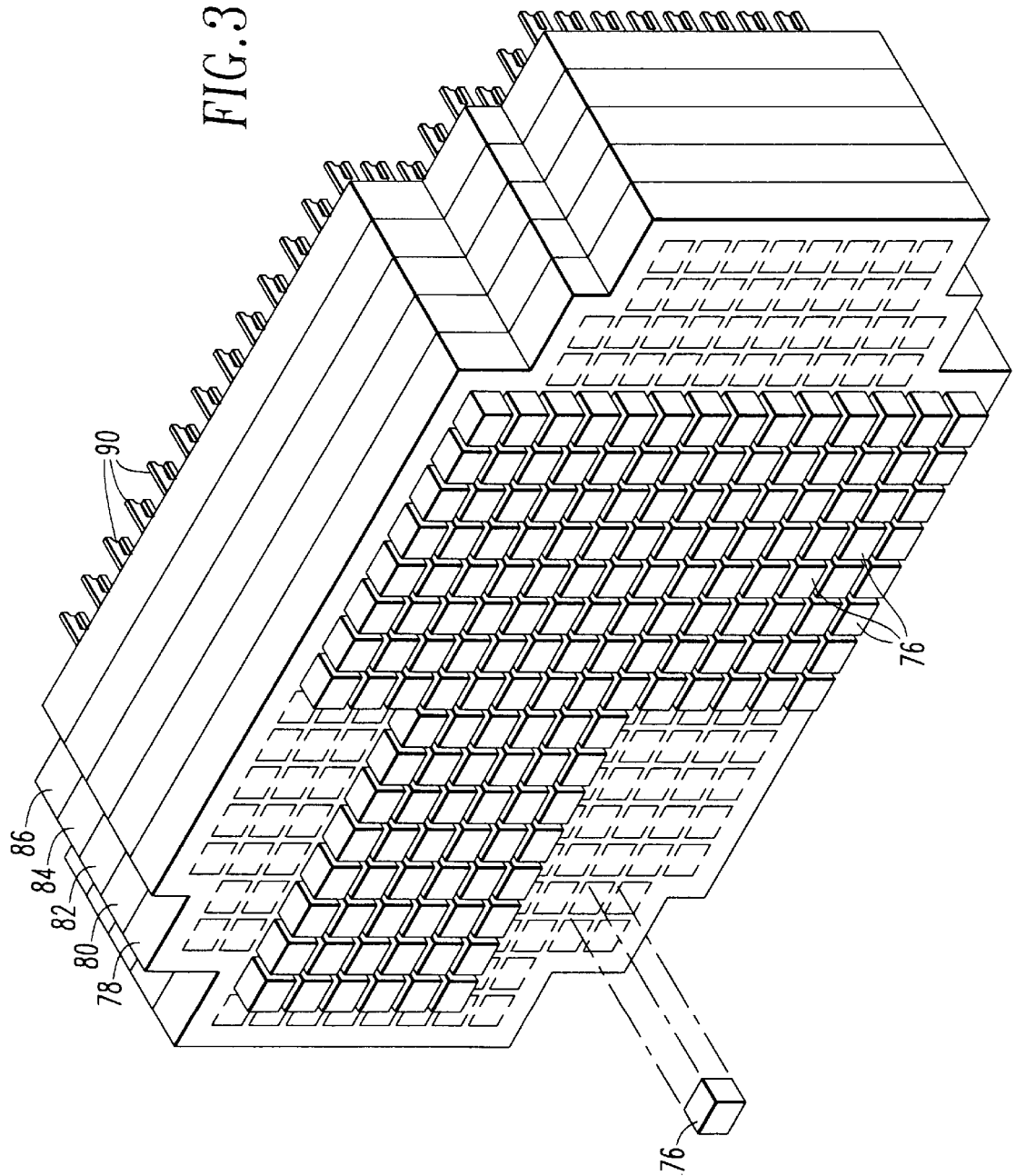
FIG. 3 is a perspective view generally illustrative of the concept of T/R modules in accordance with the subject invention being plugged into the back of a planar array of a phased array antenna system.
Figure 5:
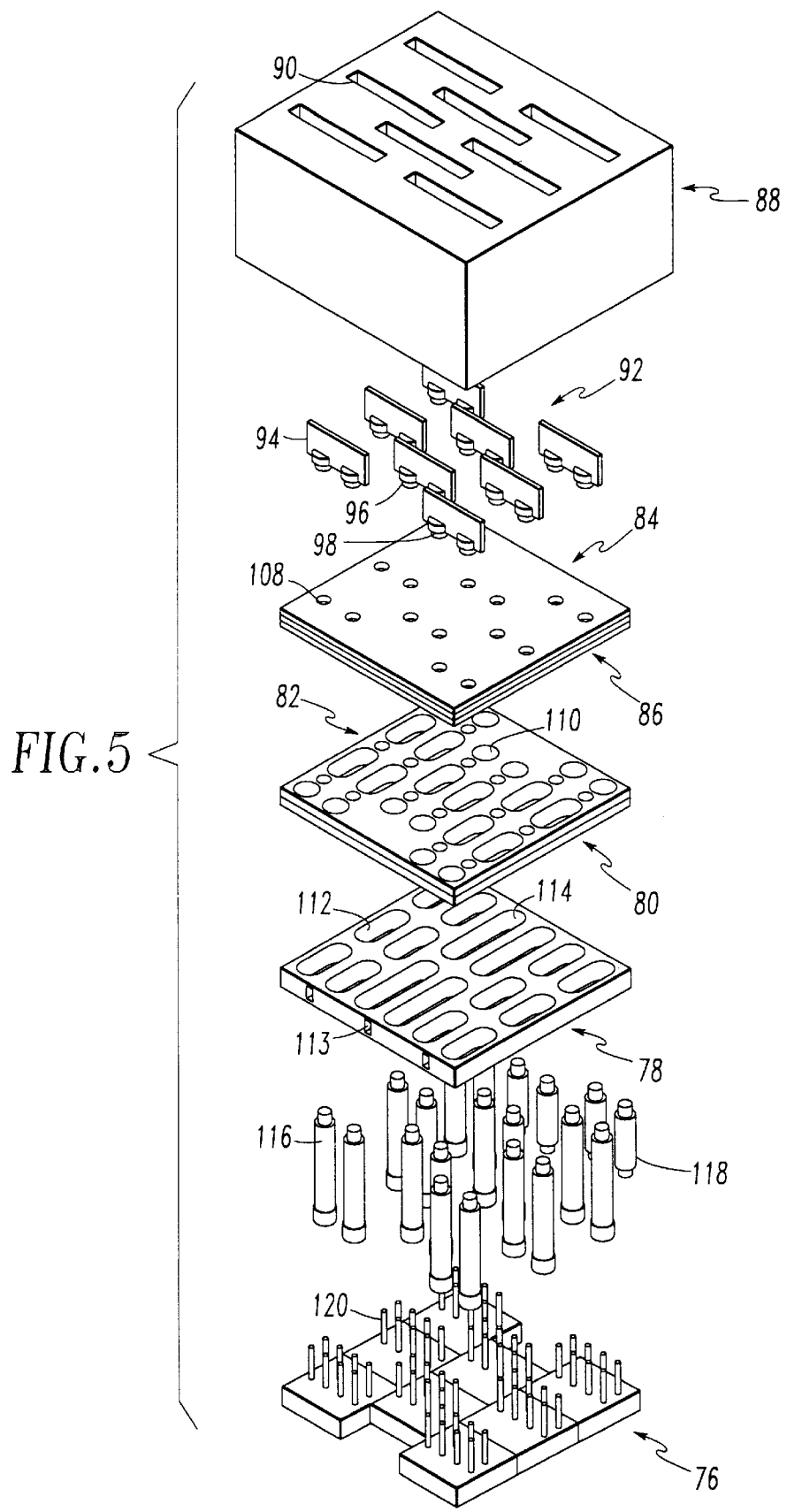
FIG. 5 is an exploded perspective view illustrative of the components in the planar array shown in FIG. 3.

FIG. 5 is generally illustrative of the structural arrangement of the planar array shown in FIG. 3. Inasmuch as all of the T/R modules 76 are located at the rear of the assembly rather than at the front, as is normally done in conventional planar arrays, in the instant invention design considerations and other factors, particularly a desired feature of easy replacement, dictates its position as shown at the rear of the assembly. Accordingly, power, digital control data and RF signal coupling is achieved by suitable apertures or openings being located in the manifolds between the circulator assemblies 92 and the T/R module 76 as shown, for example, by reference numerals 108, 110, 112 and 114. This construction provides a structure which resembles "swiss cheese" in appearance and through which tubular sleeves 116 and 118 are placed. These elements permit the connector pins 120 of the T/R modules 76 to be connected, as required, to the circulator assembly 92, the RF manifolds 84 and 86, the DC power manifold 80 and the data distribution manifold 82.

Each T/R module 76 is identical in its implementation and comprises an architecture that shares its control functions of gain trim and phase shift as well as intermediate power amplification during both transmit and receive modes of operation. Accordingly, as shown by the electrical block diagram of FIG. 6, the T/R module 76 includes: a receiver protector (R/P) element 122 comprising a diode; a low noise amplifier 130 comprised of a GaAs MMIC 124 including two stages of amplification shown by reference numerals 126 and 128, an RF switch and phase shifter (SW/PHS) MMIC 130 including a single pole double throw RF switch 132 and a digitally controlled phase shifter 134, a gain trim attenuator/driver amp/switch (ATT/DVR/SW) MMIC 136 including two stages of pre-driver amplification 138 and 140, a second single pole double throw switch 142 located between a pair of digitally controlled gain trim attenuators 144 and 146 and one stage of driver amplification 148; and a power amplifier MMIC 150 including three stages of amplification shown by reference numeral 152, 154 and 156.

Figure 6:
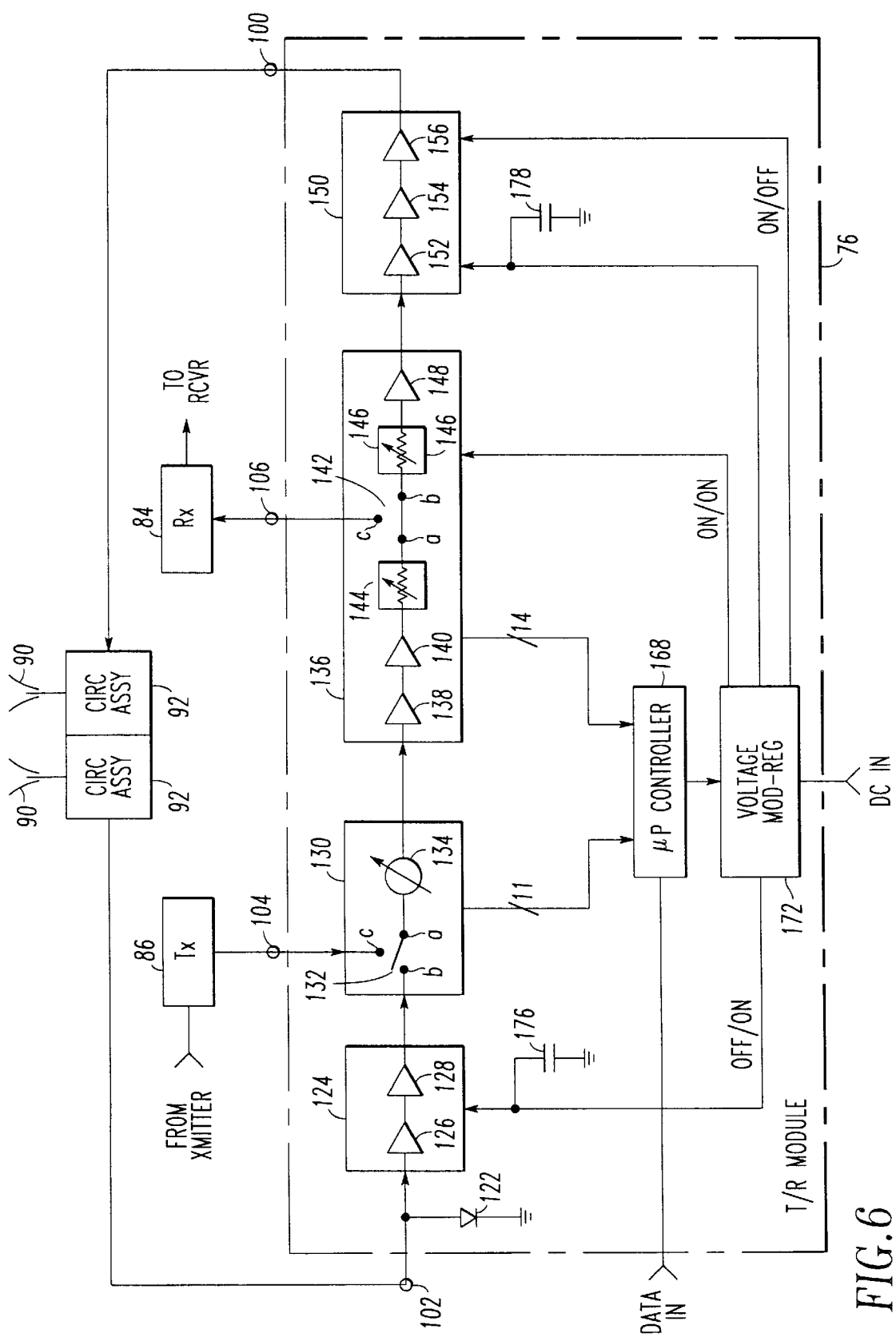
FIG. 6 is an electrical block diagram illustrative of the preferred embodiment of the invention.

Referring now briefly to FIGS. 7 and 8, the GaAs MMICs 122–150 are selectively located in three separate cavity regions 158, 160 and 162 in the upper surface of an RF assembly layer 164 which comprises one layer of a multi-layer structure making up the T/R-Module 76 which also includes an upper layer 166 containing the microprocessor controller 168 (FIG. 6), a layer 170 containing the voltage modulator-regulator 172 (FIG. 6), and outer layer 174 containing energy storage devices such as the capacitors 176 and 178 (FIG. 6). The cavity regions provide the necessary RF isolation and aids heat transfer to an underlying heat conducting substrate, not shown.

The overall shape of the T/R package 76 including the layers 164, 166, 170 and 174 is substantially square. This optimally utilizes the planar aperture area allocated per T/R module. Allocated area is a function of radiating element spacing which is driven by maximum operating frequency, maximum scan angle, and radar cross-section considerations. A rectangular area T/R module package makes most efficient use of allocated area because MMIC shapes are rectangular and can be arranged to utilize rectangular areas more efficiently than polygonal shaped areas.

In the preferred embodiment of the T/R module 76 RF interconnections between MMICs are made by wedge bonding. This is done to conserve circuit area, to reduce RF interconnect lengths, and to maximize T/R module instantaneous bandwidth. Reflections between interconnected MMICs result in gain ripple across frequency that affects instantaneous bandwidth if transmission line lengths between MMICs become excessively long.

FIG. 9 depicts the concept of wedge bonding, which essentially consists in making interconnections of lead terminations, 180 with gold metal pads 182 on the top surface 184 of a MMIC by means of a wedge tipped bonding tool 186.

Directing attention now back to FIG. 6, the microprocessor controller 168 which receives digital data from a beam steering computer, not shown, in addition to controlling the operation of the RF switches 132 and 142, as well as the gain trim attenuators 144 and 146, also controls the application of the supply potentials applied to the low noise amplifier 124 including the two amplifier stages 126 and 128 and the power amplifier including the amplifier stages 152, 154 and 156 so that they are alternately OFF and ON in opposition to one another during transmit and receive periods. This means that the low noise amplifier 124 is OFF during a transmit period while the power amplifier is ON during the same transmit period and conversely the low noise amplifier 124 is ON during a receive period while the power amplifier is OFF.

It should be noted, however, with respect to the amplifiers 138, 140 and 148 in the pre-drive amplifier and drive amplifier MMIC 136, that these amplifiers continuously receive supply voltages during both the transmit and receive period and thus the current constantly drawn by these amplifiers preloads the regulator-modulator 172. Accordingly, the regulator circuits, not shown, in the voltage modulator-regulator 172 are always operated in a linear range, thus allowing it to rapidly switch the transmitter and receiver MMIC 124 and 150 ON and OFF. The amplifier current drawn would contribute to increased transmitter power consumption if the amplifiers 138, 140, and 148 were dedicated to be simply a driver amplifier and if the receiver amplifiers 126 and 128 were dedicated simply as a post amplifier. However, the low noise amplifier 124 which acts as a post amp and the power amplifier 150 which is in fact a dedicated driver amplifier are alternatively turned ON and OFF. Thus, there is no increase in power consumption when the amplifiers 138, 140 and 148 are operated continuously. As a result, such a configuration permits preloading of the transmit/receive regulator-modulator 172 without degrading overall T/R module efficiency.

It can be seen with reference to FIG. 6 that RF signals from a transmitter unit, not shown, are fed first to the Tx manifold 86 and then to the RF switch 132 in SW/PHS MMIC 130 where it proceeds through the variable phase shifter 134 to the ATT/DVR/SW MMIC 136 to the PWR AMP MMIC 150 where it is then coupled to the output port 100 and then to the circulator assembly 92 where it is radiated by an antennae element 90.

During the receive interval the operating states of the RF switches 132 and 142 reverse and the received RF energy from an antennae element 90 is coupled to the input port 102 via a circulating assembly 92 where it is fed to the R/P diode 122 and LNA MMIC 124 and thence to the SW/PHS MMIC 130 and the ATT/DVR/SW 136 where it is fed from the output port 106 to the Rx manifold 84 via the amplifier stages 138 and 140, the gain trim attenuator 144, and RF switch 142.

Thus, what has been shown and described is an improved T/R modular configuration for a planar array that plugs into the back side of a planar active aperture with RF, DC, and data distribution manifolds being stacked together between a cold plate and a radiating element assembly.

The invention being thus described it would be obvious that the same may be varied in many ways. Such variations are not to be regarded as a departure from the spirit and scope of the invention, and all such modifications as would be obvious to one skilled in the art are intended to be included within the scope of the appended claims.

What is claimed is:

1. A transmit/receive (T/R) module for alternately coupling RF signals between transmitter apparatus and a radiator during a transmit mode, and between a radiator and receiver apparatus during a receive mode, comprising:

first and second RF signal input ports and first and second RF signal output ports;

a first RF signal path between one of said input ports and one of said output ports during the transmit mode to transmit an RF signal from the transmitter apparatus to the radiator;

a second RF signal path between the other of said input ports and the other of said output ports during the receive mode to couple an RF signal received by the radiator to the receiver apparatus;

said first and second RF signal paths including a common circuit segment including a variable phase shifter, a variable attenuator, and an RF amplifier which are mutually shared during both said transmit and receive modes of the module and in which current direction is the same in said transmit and receive modes;

an RF power amplifier switched into said first RF signal path during said transmit mode;

a low noise amplifier switched into said second RF signal path during said receive mode;

a protective device coupled to said low noise amplifier for protecting the receiver apparatus from undesired power level of received RF signals during the receive mode; and wherein said variable phase shifter, said variable attenuator, all of said amplifiers and said protective device comprise integrated circuit elements located on a planar support structure.

2. A transmit/receive module in accordance with claim 1 and further including first and second switches connected to opposite ends of said common circuit segment for connecting the first signal path between a transmit manifold and said power amplifier during a transmit mode, and for connecting said second signal path between said low noise amplifier and a transmit manifold during said receive mode.

3. A transmit/receive module in accordance with claim 1 wherein said power amplifier is energized with a DC power supply voltage only during said transmit mode and said low noise amplifier is energized with said DC power supply voltage only during said transmit mode while said RF amplifier of said common circuit segment is continuously energized with DC power supply voltage during both said transmit mode and said receive mode, whereby a supply voltage regulator/modulator feeding DC power for a supply source to said amplifiers is preloaded without degrading module efficiency.

4. A transmit/receive module in accordance with claim 1 wherein said integrated circuit elements comprise monolithic microwave integrated circuit chips.

5. A transmit/receive module in accordance with claim 4 wherein said microwave integrated circuit chips are located in a plurality of cavities formed in said planar support structure.

6. A transmit/receive module in accordance with claim 5 wherein said monolithic microwave integrated circuit chips are fabricated in gallium arsenide (GaAs).

7. A transmit/receive module in accordance with claim 6 wherein said planar support structure is comprised of plural layers of high temperature cofired ceramic (HTCC).

8. A transmit/receive module in accordance with claim 7 wherein said plurality of layers of HTCC include ground planes, strip line, data and DC interconnects, thermal vias, and RF input/outputs.

9. A transmit/receive module in accordance with claim 5 wherein said monolithic microwave intergrated circuit chips in said planar support structure comprises a portion of a plug-in package which additionally includes RF, DC and data distribution manifolds stacked together contiguously between a cold plate and a radiating element assembly including a plurality of radiating elements and circulator forming the front layer of a planar active aperture of a phase array.

* * * * *